(No Model.)
J. B. NEYRAUD.
ELECTRIC PILE.
No. 347,823. Patented Aug. 24, 1886.
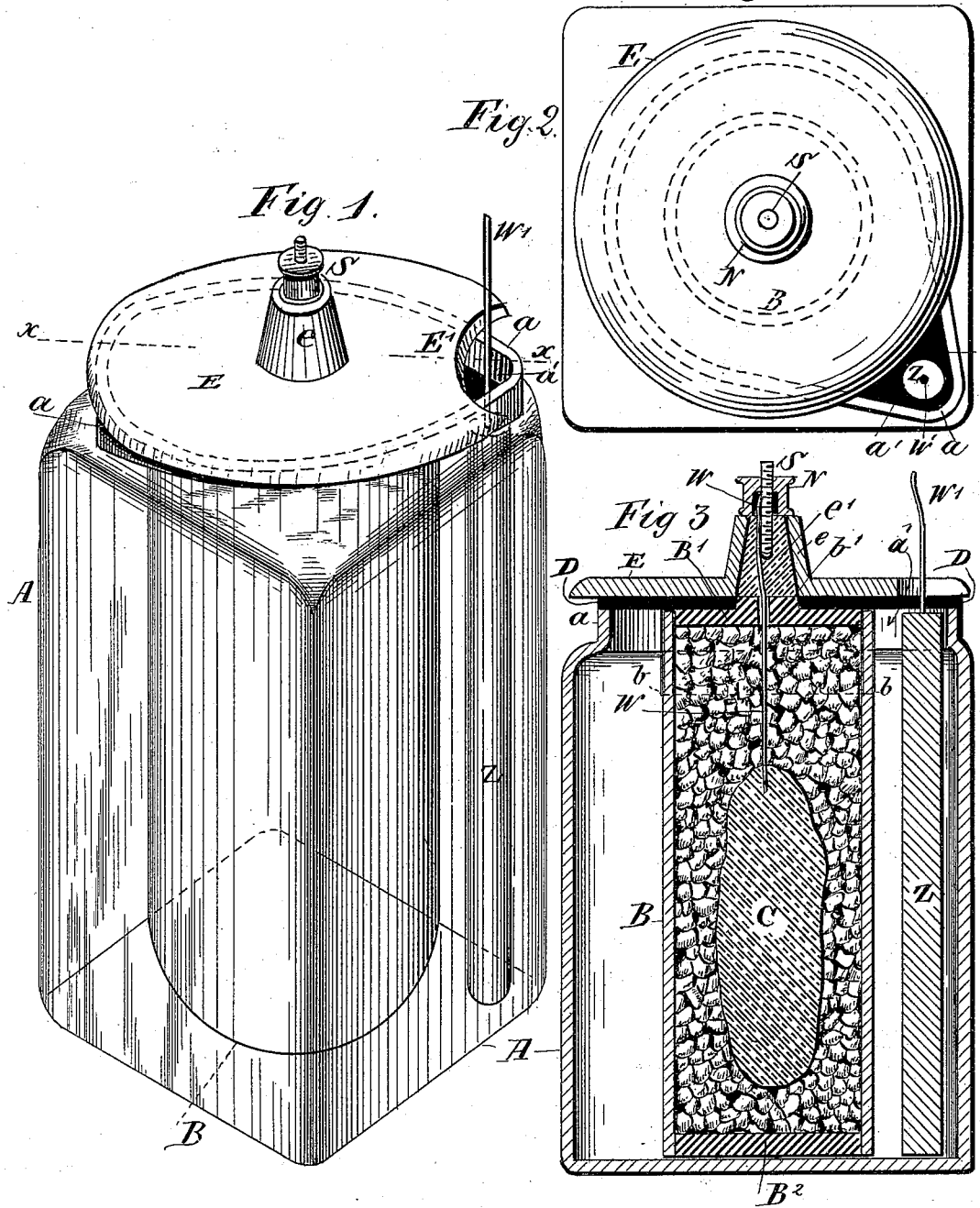
Witnesses.
W. E. Boulter.
Paul M. Knobloch.
Inventor
Jean B. Neyraud
per Henry Orth
his atty

UNITED STATES PATENT OFFICE.

JEAN BAPTISTE NEYRAUD, OF LYONS, FRANCE.

ELECTRIC PILE.

SPECIFICATION forming part of Letters Patent No. 347,823, dated August 24, 1886.

Application filed July 27, 1885. Serial No. 172,780. (No model.) Patented in France January 27, 1885, No. 166,643.

*To all whom it may concern:*

Be it known that I, JEAN BAPTISTE NEYRAUD, a citizen of the French Republic, residing at Lyons, in France, have invented certain new and useful Improvements in Electric Piles, (for which I have obtained Letters Patent in France, No. 166,643, dated January 27, 1885,) of which the following is a full, clear, and exact description.

This invention relates to galvanic elements, and has for its object to prevent the oxidation of the binding screw or screws or other connections whereby the electrodes are connected with the line-wires; and it consists in the details of constructions of the element, and more especially the construction of the inner porous cylinder and the head or cover of the cell, substantially as hereinafter fully described, and as specifically pointed out in the claims.

Referring to the accompanying drawings, Figure 1 is an isometric view; Fig. 2, a top plan view, and Fig. 3 a vertical section taken on line $x$ $x$ of Fig. 1 of my improved galvanic element.

A indicates the inclosing or outer vessel of the element, which is made of any suitable material capable of resisting the action of the exciting agent or fluid, preferably of glass. This outer vessel may be of any desired shape in cross-section. In the drawings I have shown it as being square in cross-section, though it could be made cylindrical or hexagonal, or of other angular form.

The vessel A is preferably provided with a neck, $a$, of cylindrical form in plan, as shown partly in dotted and partly in full lines in Figs. 1 and 2, the tapering portion of the neck extending over one of the corners of the vessel, so that when a cylindrical cover, E, is employed an aperture, $a'$, will be left at the tapering portion for the introduction into vessel A or the removal therefrom of the zinc electrode Z, as shown in Fig. 2, though it will be understood that a cover of substantially the form of the neck may be used, in which case that part overlying the tapering portion is cut away, as shown at E', Fig. 1, to afford access to the interior of vessel A for the introduction thereinto or removal therefrom of said zinc electrode.

B is the porous vessel or cell, preferably of cylindrical form. It is closed at top and bottom by means of heads B' and B², respectively, composed of an insulating material or composition impermeable to and capable of resisting the action of the exciting-fluid. The head B' has an axial conical projection, $b'$, apertured for the passage of a platinum wire, through which the carbon electrode C is connected with the binding-screw S and the line-wire in the usual or any preferred manner.

The carbon electrode contained in cell B is embedded in comminuted carbon C', with which the cell is filled, as shown in Fig. 3. By means of the described construction the exciting-fluid cannot penetrate into the cell B, except by percolation through its porous walls.

The cell B is of such height that its upper edge will lie flush (or approximately so) with the corresponding edge of the neck $a$ of vessel A, and above said cell is arranged a disk, D, of a material similar to that of the heads B' and B² of the cell B. The disk is seated on neck $a$ of vessel A, around the conical projection $b'$ and on head B', to which latter it may be cemented, or of which said disk may form an integral part.

E is the cover for the element, preferably of porcelain, though it may be made of other insulating material impermeable to and unaffected by the exciting-fluid.

The cover E has a hollow axial conical boss, $e$, projecting from its upper face, and is firmly seated on or cemented to the insulating-disk D, that surrounds the cone $b'$ on the head B' of the porous cell B. The cone or boss $e$ has a lead filling, $e'$, in which is embedded the binding-screw S, or into which filling said screw may be screwed. N is the nut of said screw.

The platinum wire W, that connects the carbon electrode C with the binding-screw S, passes through the cone $b'$ and the lead filling in cone $e$. To further protect the binding-screw against the action of the exciting-fluid which may percolate through the walls of the cell B, I enamel or glaze the inner surfaces of the hollow conical boss $e$ on cover E, as shown by heavy lines, Fig. 3, and also the surfaces of the porous cylinder or cell B from about a point, $b$ $b$, to its upper edge, both inside and outside, as well as the annular upper face of said cell.

It is obvious that by means of the construction described the exciting-fluid cannot reach the screw S in the lead filling of the cone e, either by percolation through the body of the cell B, the upper portion of which is enameled or glazed, as set forth, or when the vessel A is filled with the exciting-agent, as the upper end of the cell B is closed by an impermeable non-conductive material of such nature as not to be affected by the exciting-fluid. Besides this the cover E is made of porcelain and isolated from the vessel A by means of a disk, D, also of an insulating and impermeable material, and one not influenced or acted upon by the exciting-fluid.

I thus obtain a galvanic element the function of which is more regular than is the case with like elements of usual construction, and such element will be much more durable.

I am aware that attempts have been made to isolate the binding-screws from the action of the exciting-fluid; but this has never been so completely effected as by the construction hereinabove described, the electrode being usually secured by metallic clamps and connected with the binding-screw by means of metallic connections readily affected and corroded by the liquid and fully exposed to its action.

Of course it will be understood that the disk D and head B' of the cell B may be made integral and of a non-conductive plastic composition impermeable to and not affected by the exciting-fluid, and the cover E may be firmly embedded therein; or the cover E and disk D may be made integral and firmly embedded in the material of which the head B' of the cell B is made, and while in a plastic state, so that the said cell may be bodily lifted out of the vessel A by means of the binding-screw S or the cover E.

What I claim is—

1. In a galvanic element, the combination, with the inclosing-vessel containing the exciting-fluid and zinc electrode, of a porous earthenware cell containing the carbon electrode, said cell being closed at both ends by impermeable heads capable of resisting the action of the exciting-fluid, and having the outer surface of its upper end rendered non-porous by porcelaining or enameling, a porcelain head or cover for the cell cemented to the head of the porous cell and carrying the binding-screw, and a platinum connection for connecting said binding-screw with the carbon electrode, said platinum connection and binding-screw being isolated from the exciting-fluid, substantially as and for the purpose specified.

2. The combination, with the vessel A and zinc electrode Z, of the porous vessel B, having its upper end rendered non-porous, and provided with heads B' B², the head B' having a conical boss, b', the carbon electrode C, contained in said cell, a cover, E, having a hollow conical projection, e, filled with lead, a binding-screw, S, embedded in said lead filling, the disk D, and a platinum connection between the carbon electrode and binding-screw passing through head B' and lead filling, of cone e of cover E, substantially as and for the purpose specified.

In testimony that I claim the foregoing I have hereunto set my hand this 26th day of June, 1885.

JEAN BAPTISTE NEYRAUD.

Witnesses:
AUGUST BORLOZ,
CAMILLE CHARROPPIN.